No. 721,422. PATENTED FEB. 24, 1903.
F. A. CHAPMAN.
ACCOUNT CARRIER.
APPLICATION FILED FEB. 16, 1900.
NO MODEL. 4 SHEETS—SHEET 1.
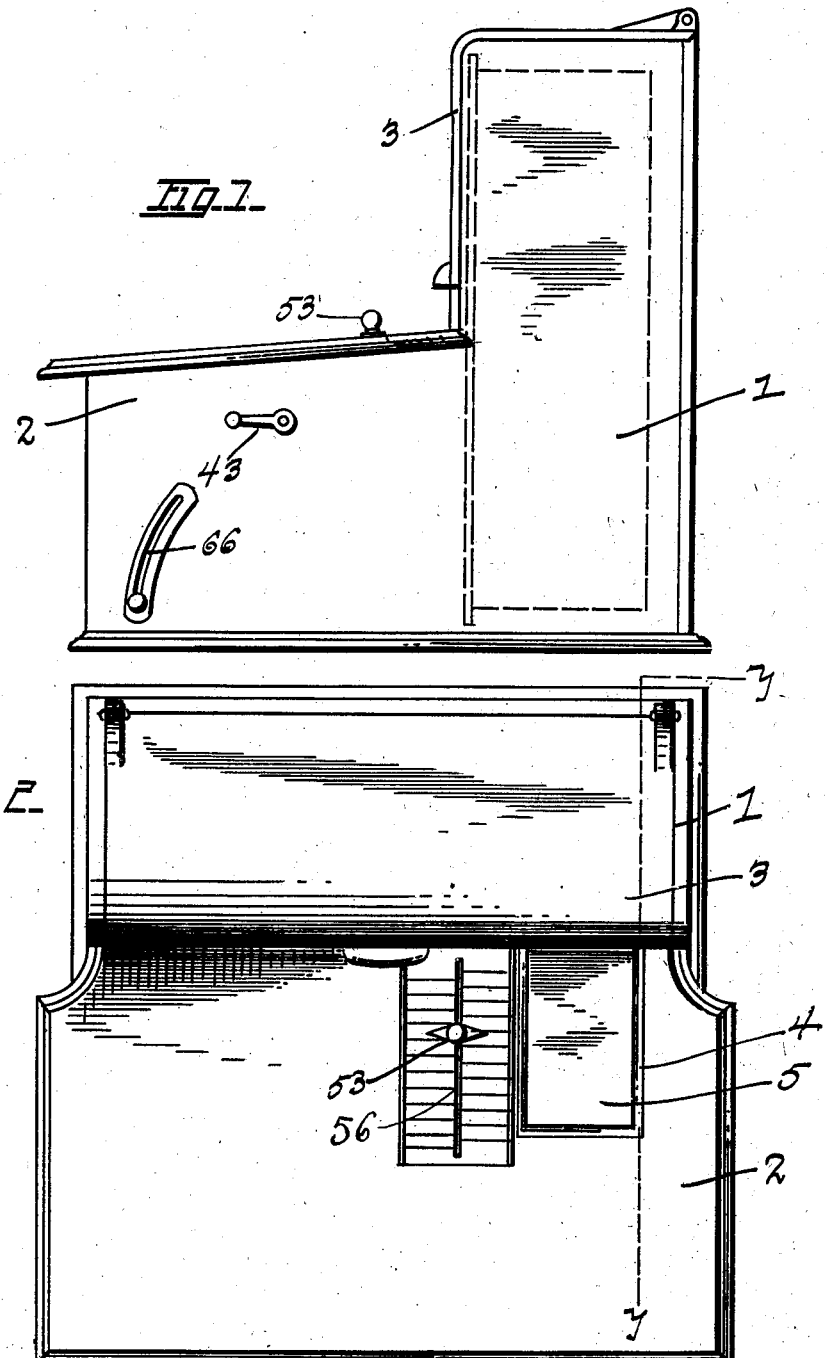

No. 721,422. PATENTED FEB. 24, 1903.
F. A. CHAPMAN.
ACCOUNT CARRIER.
APPLICATION FILED FEB. 16, 1900.
NO MODEL. 4 SHEETS—SHEET 2.
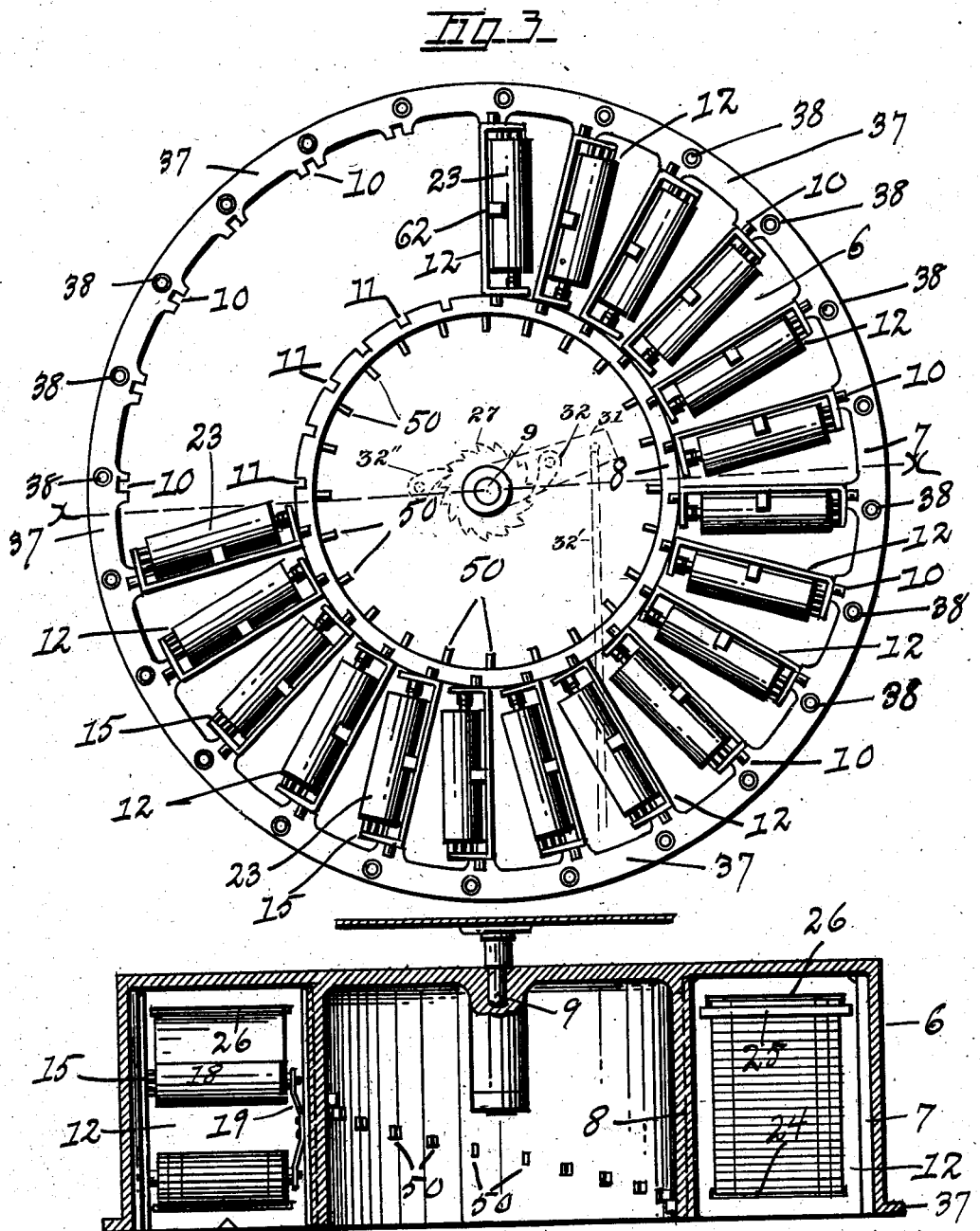

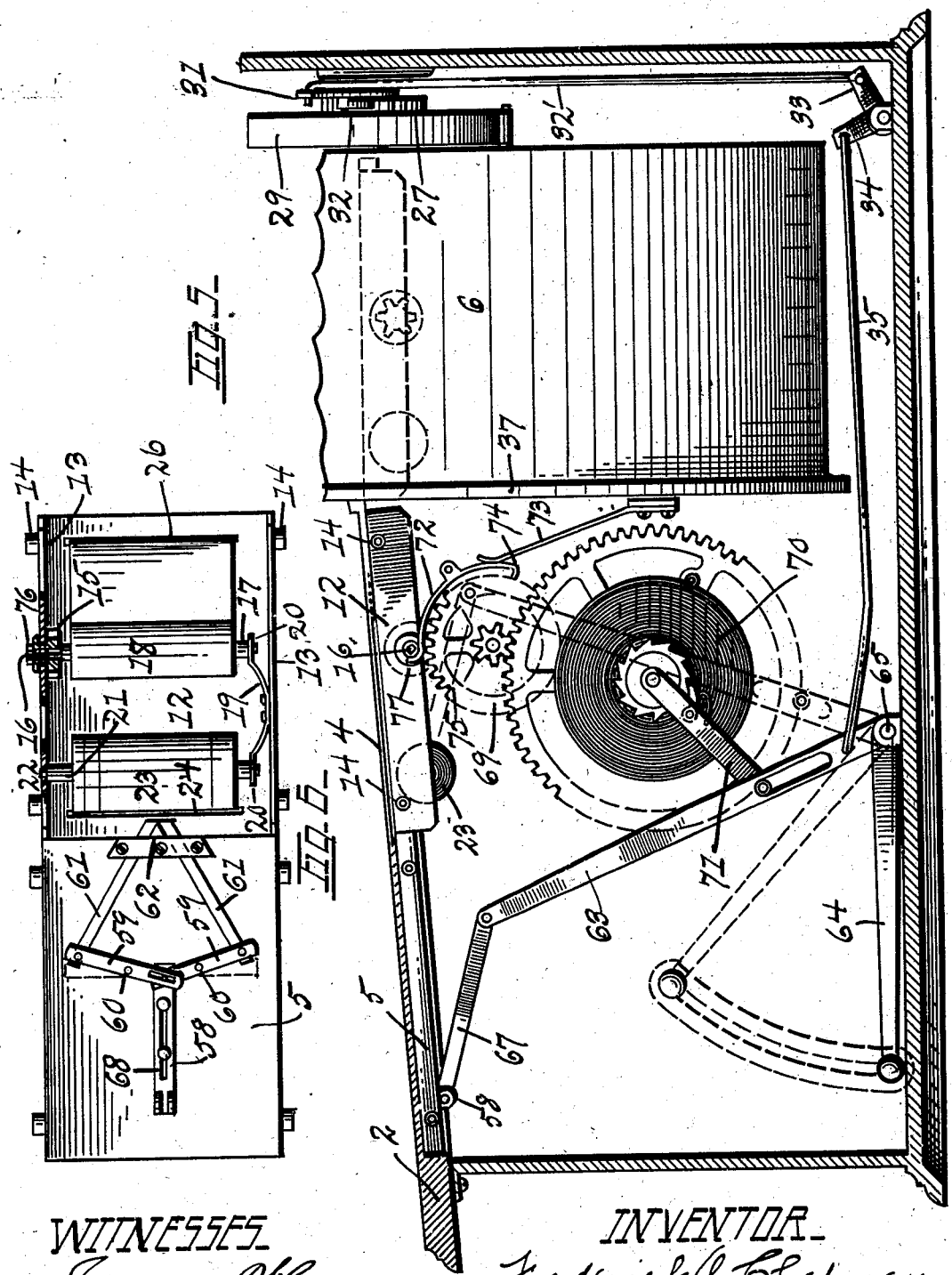

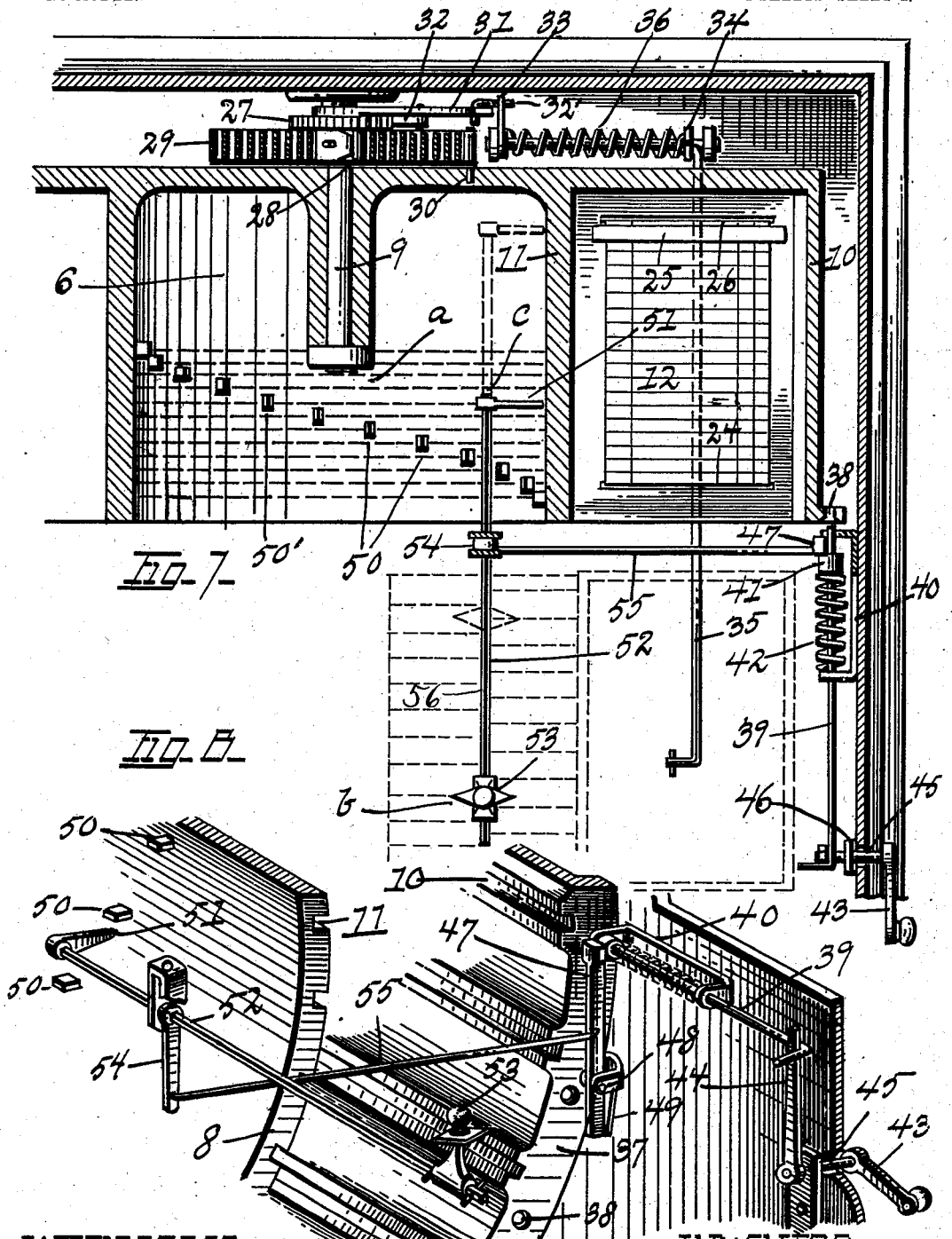

UNITED STATES PATENT OFFICE.

FREDERICK A. CHAPMAN, OF TOLEDO, OHIO.

ACCOUNT-CARRIER.

SPECIFICATION forming part of Letters Patent No. 721,422, dated February 24, 1903.

Application filed February 16, 1900. Serial No. 5,412. (No model.)

*To all whom it may concern:*

Be it known that I, FREDERICK A. CHAPMAN, of Toledo, county of Lucas, and State of Ohio, have invented certain new and useful Improvements in Account-Carriers; and I do hereby declare that the following is a full, clear, and exact description of the invention, which will enable others skilled in the art to which it appertains to make and use the same, reference being had to the accompanying drawings, and to the characters of reference marked thereon, which form part of this specification.

My invention has reference to an account-carrier, and has for its object to provide a device for more accurately and positively keeping a record of the numerous small accounts of a retail business than has heretofore been possible.

My invention is especially adapted for the use of butchers, grocers, and other retail dealers who at present keep a record of individual accounts in small books capable of being carried in the pocket. The customer holds one of these books containing a record of his account, while the dealer holds a similar book containing a transcript-copy of the record. The books held by the dealer are for the sake of convenience arranged alphabetically and kept in a pigeonhole-cabinet and are accessible to all the clerks and employees usually connected with a retail establishment. Consequently the books are often misplaced or lost entirely, and the record contained in the books can at any time be altered or tampered with. Furthermore, I have found that it is impossible to keep an exact duplicate record in two books, owing to the fact that a sale will be entered in one book and through oversight left out of the other entirely. As a result of this condition the accounts will not balance at the time the customer wishes to settle, and a compromise is usually effected at a loss to the dealer.

I am aware of other equally inefficient systems employed in retail establishments for carrying the record of accounts, all of which are alike objectionable.

In carrying out my invention I employ a rotatably-supported slide-carrier carrying a plurality of removable slides, each of which contains a continuous roll upon which is written an individual-account record. I further employ a suitable case, in which are confined the rotatably-supported slide-carrier and the plurality of individual accounts and novel means for withdrawing from the slide-carrier any slide, and consequently any account desired, and by said means preventing the removal of more than one slide at a time. I also employ novel means for locking and releasing the rotary slide-carrier.

My invention further consists in other specific features of construction and the parts and combination of parts hereinafter shown, described, and claimed.

In the drawings, Figure 1 is a side elevation of the case for confining the operating mechanism and also the rotary carrier, the position of which is shown in dotted lines. Fig. 2 is a plan view of my invention. Fig. 3 is a front elevation of the rotary slide-carrier. In this figure some of the slides are shown withdrawn from their respective places in the carrier. Fig. 4 is a transverse section of the rotary carrier on line *x x*, Fig. 3. Fig. 5 is a section through the case on line *y y*, Fig. 2, and discloses the means for withdrawing a slide from the rotary carrier and also the mechanism for winding up the record-roll mounted upon the slide. The position which the slide occupies after its return to the carrier is shown in dotted lines. Fig. 6 shows the mechanism for gripping the slide and withdrawing the same from the carrier. This mechanism is placed on the lower side of the sliding section in the desk-like portion of the case. Fig. 7 is a plan view of the slide-carrier locking and releasing mechanism. Fig. 8 is a perspective view of the carrier locking and releasing mechanism.

Referring to the parts, the case consists of the elevated section 1, in which the slide-carrier rotates, and the desk-like section 2. Section 1 is formed with a hinged portion 3, which when elevated gives access to the slide-carrier and permits the removal of the account-carrying slides. Section 3 is, however, secured in a closed position by the employment of an ordinary lock and key, the illustration of which is not deemed necessary. This prevents the unauthorized removal of the slides from the carrier. In the writing-table of the desk-like portion 2 is a rectangular opening 4, formed on its sides with guideways or grooves which are extended upon the lower side of the table, and provides a slideway for a sliding section 5 and also the account-carrying slides as they are withdrawn from the rotary carrier.

6 indicates the rotary slide-carrier, preferably formed of two concentric cylindrical sections 7 and 8, respectively secured together in this relation and revolubly mounted upon a stationary stud 9. The inner face of section 7 is formed with equidistant parallel grooves 10. In like manner the outer face of section 8 is formed with grooves 11, equal in number to grooves 10. These grooves when combined form pockets for the reception of the account-carrying slides 12. These slides are preferably formed of a single piece of sheet metal the sides of which are bent downwardly, as at 13, upon which are mounted antifriction-rollers 14, adapted to roll in the grooves 10 and 11 and also the grooves in the writing-table of the case, hereinbefore referred to. In one of the sides 13 is revolubly mounted a pinion 15, having a squared axial recess 16 to receive the squared end of a spindle 17, upon which is wound to form a roll 18 a carbon or other suitable facsimile copy of an individual-account record. Upon the opposite side to that in which the pinion is mounted is secured centrally thereof by means of rivets, as shown, a spring 19, the ends 20 of which are free from the side of the slide and are perforated, the one end to receive the reduced end of spindle 17, the other to receive the reduced end of a spindle 21. The opposite end of spindle 21 is also reduced to enter a perforation in the side of the slide at 22. Upon spindle 21 are wound simultaneously to form a roll 23 two or more ribbons of paper or other suitable material, the outer one of which is preferably ruled and lined up to receive the original record of all articles sold to a customer, the inner one, where two ribbons only are employed, receiving a carbon-copy of the record. The ribbons are guided from the roll 23 through an elongated slot 24, over the face of the slide, under a suitable knife, (indicated by the numeral 25.) The lower ribbon is then guided through a slot 26 and is wound upon the spindle 17 to form the roll 18. The outer ribbon as the record is entered thereon is severed by drawing over the knife 25. This ribbon is preferably printed in sections and numbered consecutively. By mounting the ends of spindles 17 and 21 in the free ends of the spring 19 it is obvious that their removal and insertion are easily accomplished.

I will now proceed to describe the various mechanisms in the order of their operation, the first being the carrier locking and releasing mechanism. Before entering upon this description, however, I will briefly describe the means I employ to rotate the slide-carrier. It is desirable that the carrier be given a right-hand rotation. As before stated, the carrier is revolubly mounted upon a stationary stud 9. Upon the same stud is loosely mounted a ratchet-wheel 27, having a hub portion 28, to which is suitably secured the inner end of a band-spring 29. The outer terminal of the spring 29 is secured to the carrier-body by attachment to a pin 30.

31 is a reciprocating lever, which carries a pawl 32 to operate the ratchet-wheel 27.

32" is a stationary pawl to prevent the backward movement of the ratchet-wheel 27. Lever 31 is actuated by a vertically-extending rod 32', connected to the arm 33 of a compound bell-crank lever, the other arm 34 of which is connected through a rod 35 to the arm 63 of the slide-withdrawing mechanism, to be hereinafter described. Arms 33 and 34 are loosely mounted and are joined together by a spring 36, which forms a resilient flexible connection between them. By this means undue strain upon the parts which wind the band-spring is insured against. It will be apparent that as the slide-withdrawing mechanism is operated motion will be transmitted through the parts described and the band-spring wound up to rotate the carrier. It is essential that the band-spring be coiled up sufficiently to give a single rotation to the carrier. This is easily accomplished by varying the proportion of the lever-arm and by reciprocating arm 63 should the tension of band-spring 29 at any time be found insufficient to rotate the slide-carrier. If no means were provided to lock the carrier against rotation, the same would revolve the instant the band-spring was wound. For this purpose and for the other important ends to be accomplished I provide the carrier locking and releasing mechanism, Figs. 7 and 8. The carrier proper is formed with an annular flange 37, in which are equidistant perforations 38 of a number corresponding to the number of slides in the carrier.

39 is a bolt having a longitudinal movement in a frame 40 and is adapted to enter the perforations 38 in the slide-carrier.

41 is an enlargement on the bolt.

42 is a coiled spring interposed between the enlargement 41 and the end of the frame 40 to cause the bolt to enter the perforations 38 when released. Bolt 39 is extended beyond frame 40 and is bent at right angles to permit of its being actuated by the releasing-lever 43 from the exterior of the case through the medium of the arm 44 and the spindle 45, supported at 46.

47 is a locking-bar pivoted at 48 and held in contact with the enlargement at 41 by a spring 49. When the bolt 39 is withdrawn to release the carrier, the locking-bar is forced between the enlargement 41 and the frame 40 and holds the bolt from returning. On the inner face of the cylindrical section 8 of the carrier are inwardly-extending lugs 50, equal in number to the slides contained in the carrier. Each lug has a different plane of rotation, (indicated by dotted lines a, Fig. 7.)

51 is a trip-lever rigidly attached to the end of a sliding rod 52, on the opposite end of which is loosely mounted the indicator-knob 53, arranged with indicator-points on opposite sides of its base. Rod 52 is preferably square in cross-section and slides through the arm 54, which is formed with a square perforation and is adapted to turn therewith.

55 is a rod connecting the arm 54 with the locking-bar 47. The indicator-knob 53 is designed to extend above the desk-like portion of the case and to move along a slot 56. On opposite sides of the slot are arranged staggered lines. These lines may be printed upon a suitable card upon which are written the names of customers, there being a longitudinal central slot in the card coincident with the slot in the case to permit the unobstructed movement of the indicator-knob along the lines. The lines on the opposite sides of the slot are arranged at equal distances apart corresponding to the distances between the planes of rotation of the lugs 50. Therefore when the indicator-knob is moved to the position shown at $b$, Fig. 7, the trip-lever 51 will take the position $c$ in the arc of rotation of the lug 50'. When the locking-bolt is withdrawn, the carrier will rotate in a right-hand direction and the lug 50' will contact with the trip-lever and release the bolt through the medium of the sliding rod 52, the arm 54, and the connecting-rod 55. The mechanism is adjusted so that the bolt will be released immediately after passing the perforation preceding the one into which it is designed to enter, as shown by the indicator. It is evident that the carrier can be locked at any desired point or division of its rotation. The locking and releasing mechanism is so carefully adjusted with relation to the carrier that the grooves in which the account-carrying slides are contained will aline with the grooves provided for the sliding section 5 in the top of the desk-like portion 2.

I will now describe the means which I employ to grip the individual-account-carrying slides and the means employed to withdraw them from the slide-carrier. The gripping mechanism is placed upon the lower side of the sliding section 5 and consists of a sliding bar 58, adapted to operate the laterally-extending arms 59, pivoted at 60 and having their ends secured to the converging bars or grips 61, which are shown in Fig. 6 as extending beyond the end of the sliding section 5 and coacting with a downwardly-extending lug 62, triangular in form, secured to the slide-frame. The lever which is operated to withdraw a slide from the slide-carrier is formed of two arms 63 and 64, respectively fulcrumed at 65. The arm 64 terminates in a knob which is actuated from the exterior of the case and traverses the arc-shaped slot 66. The arm 63 is connected to the sliding bar 58 by a link connection 67. In Fig. 5 is shown a slide withdrawn from the carrier. When the lever which is operated to withdraw the slides is raised to take a position shown in dotted lines, the sliding section 5 will force the account-carrying slide back into the slide-carrier, the position thereof being shown in dotted lines. This movement of the lever will also cause the sliding bar to move forward to the limit of a slot formed centrally therein (indicated by 68) and to withdraw the grips 61, leaving the face of the sliding section adjacent to the account-slide flush. The carrier containing the slide, which has just been returned to its proper position therein, can then be operated and locked at any desired division by moving the indicator-knob to the line on which is written the name of the customer whose account it is desired to add to and then operating the releasing-lever. To withdraw the slide, we will assume that the lever occupies a raised position, as shown in dotted lines. The initial effect of the downward movement of the slide-withdrawing lever is to cause the grips to project beyond the ends of the sliding section 5, and consequently grip the downwardly-extending lug 62 on the slide-frame. When this is accomplished, as shown in Fig. 6, the slide will be withdrawn from the carrier and the face thereof will be exposed through the rectangular opening in section 2 of the case. The entering of articles sold to a customer is then made upon the outer ribbon on the face of the slide. The reverse side of this ribbon may be coated with a surface of pigment to transfer the record onto the inner ribbon. To preserve the record of the account and to cause it to form a roll 18 on the lower side of the slide, I employ an ordinary clock-train 69, operated by a spring 70, which may be either wound by employing a key, or I may employ a ratchet-lever, as shown at 71, operated in any suitable manner by connection with a movable portion of the mechanism. 72 is a detent-lever contacting with a spring 73 to arrest the motion of the clock-train by having the hooked end 74 engage the teeth of the wheel 75. When the slide is withdrawn from the carrier, a projection on the side of the slide-frame at 76 engages the end of the detent-lever at 77 and releases the clock-train. At the same instant that the detent-lever is disengaged the pinion 15, mounted in the slide-frame, engages the wheel, and there is a tendency to rotate spindle 17. This is, however, prevented by the tension on the ribbon forming the roll 18. However, after the original record or entry of goods sold has been made upon the outer ribbon the same is withdrawn from the slide by unwinding roll 23. This relieves the tension on the ribbon containing the copy of the record, and the slack of the ribbon is taken up and wound upon the roll 18 as fast as presented. After the original record is made upon the outer ribbon it is severed by drawing over the knife 25 and is presented to the customer to furnish him with a record of articles purchased by him, together with the amount of each purchase. It will be seen that the complete record of an individual account will be carried upon the rolls mounted upon the bottom of the slides and that after once being entered the record will be insured against unauthorized inspection and that the chance of error in the record is positively eliminated at a great saving to the dealer. At the end of a month, when retail accounts are usually closed and presented for payment, the dealer unlocks the hinged section 3 and removes all of the slides in the carrier and also the rolls containing the month's record of individual accounts after summing up, these may be stored away for future reference. To facilitate the identification of the slides, the same may be numbered, or a label may be pasted upon each slide to contain the name of the customer whose account is recorded on the roll mounted in the slide-frame.

Having described my invention, what I claim, and desire to secure by Letters Patent, is—

An apparatus for carrying individual accounts comprising a rotatable carrier having pockets arranged radially therein to receive individual-account records, studs upon the carrier corresponding in number to the pockets and arranged to each rotate in a different plane, a sliding indicator-bar carrying a trip-lever arranged to move in the path of the studs, openings arranged in the carrier equal in number to the pockets, a locking-bolt arranged to seat in said openings, and means operated by said indicator-bar and trip-lever to release said bolt and lock the carrier at a point indicated.

In testimony that I claim the foregoing as my own I affix my signature in presence of two witnesses.

FREDERICK A. CHAPMAN.

Witnesses:
CARL H. KELLER,
LOUIS L. D. CHAPMAN.